May 28, 1946. E. M. NYGAARD 2,401,267
PREPARATION OF NITROLIC ACIDS AND PSEUDONITROLES
Filed Feb. 3, 1945
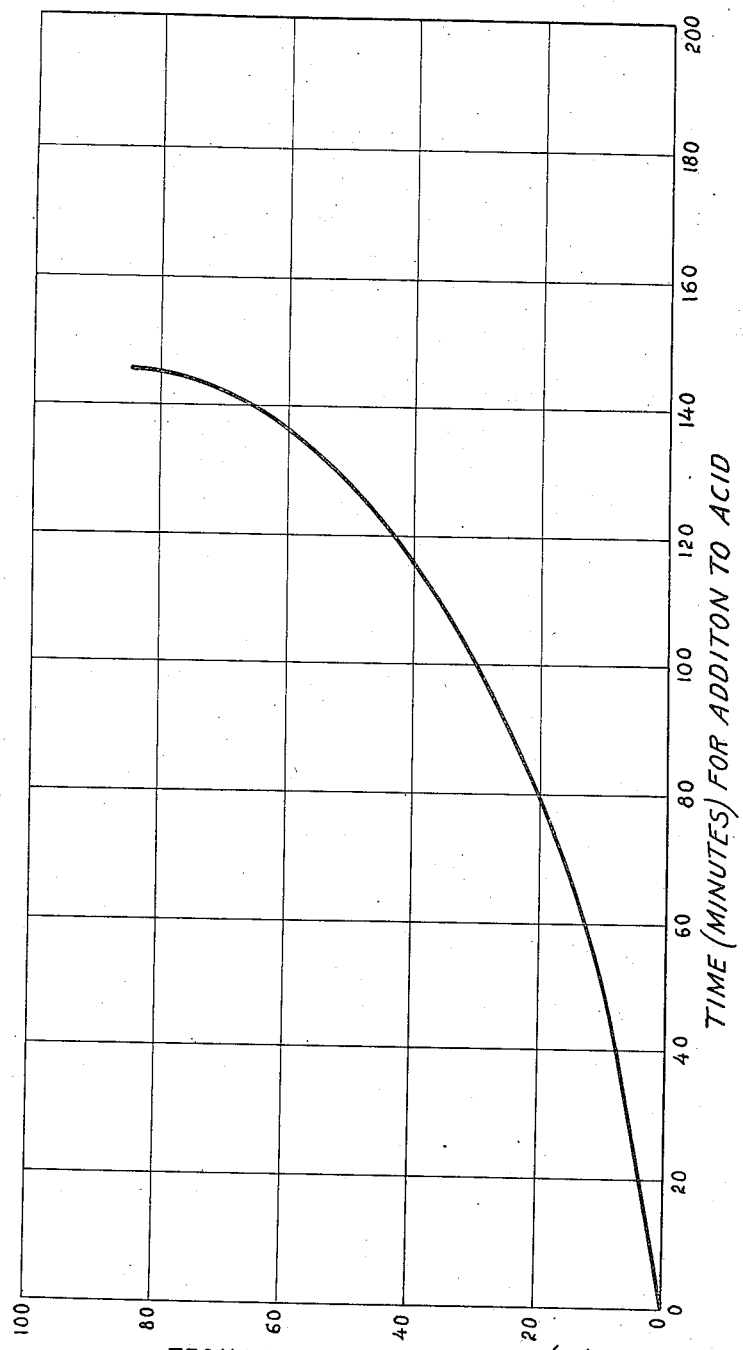
INVENTOR
EDWIN M. NYGAARD
BY
Robert D. Flynn
AGENT Patented May 28, 1946

2,401,267

UNITED STATES PATENT OFFICE 2,401,267

PREPARATION OF NITROLIC ACIDS AND PSEUDONITROLES

Edwin M. Nygaard, Woodbury, N. J., assignor to Socony-Vacuum Oil Company, Incorporated, a corporation of New York Application February 3, 1945, Serial No. 576,067

14 Claims. (Cl. 260—500)

This invention has to do with an improved method for the preparation of nitrolic acids and pseudonitroles.

It has long been known in the art that nitrolic acids and pseudonitroles are prepared by reaction of nitrous acid with primary and secondary nitroparaffins, respectively. For example, a nitrolic acid, such as propyl nitrolic acid, is obtained from primary nitropropane (1-nitropropane), as illustrated by Equation I:

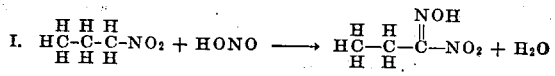

Similarly, a pseudonitrole, such as propyl pseudo nitrole, is obtained from secondary nitropropane (2-nitropropane) as illustrated by Equation II:

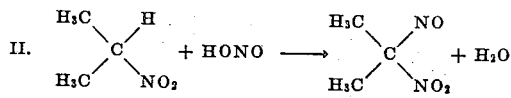

The foregoing reactions are usually carried out by dissoving a nitroparaffin—excepting $CH_3NO_2$—in aqueous alkali, then adding an inorganic nitrite and acidifying in the cold with a mineral acid. Another prior procedure involves the steps of dispersing a nitroparaffin in water, saturating the resultant dispersion with nitrous acid, making the solution strongly alkaline with an alkali metal hydroxide and then acidifying with a mineral acid. All of such methods, then, require nitrous acid, per se, or developed in the preparation from an alkali nitrite and a mineral acid.

In my copending application Serial No. 489,066, filed May 29, 1943 with John H. McCracken and Thomas T. Noland, of which the present application is a continuation-in-part, there is described a novel method for preparing nitrolic acids and pseudonitroles from primary and secondary nitroparaffins, respectively, wherein it is unnecessary to use nitrous acid or its equivalent in the form of an alkali nitrite and mineral acid. This novel method is extremely simple and merely involves contacting a nitroparaffin with substantially a stoichiometrical amount of an aqueous alkali, thereafter acidifying the nitroparaffin-aqueous alkali mixture at a temperature below about 15° C. with a mineral acid other than nitrous acid and then separating a nitrolic acid or a pseudonitrole from the reaction product so obtained.

I have now discovered that the efficiency of the method outlined above, and described in detail in the aforesaid application, is improved substantially by modifying the same, and it is upon this discovery that the present invention is predicated. The method contemplated herein involves the feature of adding the aforesaid nitroparaffin-aqueous alkali mixture to a mineral acid other than nitrous acid at a slow rate, with the temperature maintained below about 15° C., and followed by separation of a nitrolic acid or a pseudonitrole from the reaction product so obtained.

The rate of addition of nitroparaffin-aqueous alkali mixture, or nitroparaffin salt, to the aforesaid mineral acid should be slow in order that high yields of nitrolic acids and pseudonitroles be realized. In this connection, I have found that when a quantity of nitroparaffin salt of an aqueous mixture was added to substantially an equivalent quantity of said acid during a short period, as forty minutes or less, the yield of nitrolic acid or pseudonitrole was of the order of 8 per cent or less. When such quantities of nitroparaffin salt and mineral acid were used and the former added all at once to the latter, only a very small amount of the desired product was obtained. Accordingly, the more rapid the rate of addition, the smaller the yield of the desired product. It is preferred, as demonstrated by the curve in Figure I, discussed hereinafter that 0.2 mole of nitroparaffin salt as an aqueous mixture or nitroparaffin-aqueous alkali mixture be slowly added to 0.22 mole of said acid during a period of more than one hour, and particularly preferred are periods of more than two hours.

In the present method other precautions should also be observed in order to achieve a high degree of efficiency; although, as aforesaid, the slow rate of addition of nitro-paraffin-aqueous alkali mixture to a mineral acid other than nitrous acid, is the salient factor here. It is desirable, for example, to use a stoichiometrical quantity, or a slight excess, of a relatively strong alkali with the nitroparaffin reactant; however, a large excess of alkali is not conducive to the obtainment of good yields of the desired nitrolic acids and pseudonitroles. In this connection, when a 100 per cent excess of 30 per cent sodium hydroxide solution was used with 2-nitropropane, the yield of propyl pseudonitrole was very small. While various strengths of alkali, as alkali metal hydroxides and alkaline earth metal hydroxides, may be used effectively in the present method, preferred for use are aqueous alkalies having concentrations from about 10 per cent to about 30 per cent. Relatively weak alkalies, such as ammonium hydroxide and organic amines, are not contemplated herein, inasmuch as they are apparently too weakly basic to produce the salts of the nitroparaffins necessary for reaction with said mineral acid. Accordingly, as used here and in the claims appended hereto, the language "relatively strong alkali" refers to an alkali metal hydroxide or an alkaline earth metal hydroxide, and thus refers to an alkali suitable for use in the present method. It will be apparent to those familiar with the art that the nitroparaffin contacted with alkali is converted to its corresponding salt and, therefore, it will also be apparent that a salt of a nitroparaffin may be used as the starting material. In this connection, I have also found that aged mixtures of nitroparaffin and aqueous alkali, and aged aqueous mixtures of nitroparaffin salts, through some unknown behavior, give rise to greater yields of the corresponding nitrolic acids and pseudonitroles, than do freshly prepared nitroparaffin-aqueous alkali mixtures and aqueous mixtures of nitroparaffin salts. The nitroparaffin-aqueous alkali mixtures, and aqueous mixtures of nitroparaffin salts, may be aged by keeping the same at room temperature for several days or weeks or longer. This aging effect may also be influenced by heat, although the temperature should not be brought up to the decomposition temperature of the mixture or salt.

As indicated hereinabove, temperature plays an important role in this method. Temperatures both high and low, however, may be used when a nitroparaffin is contacted with an alkali; yet, temperatures of the order of 20–25° C. are preferred for this purpose. Particular care should be taken in the acidification operation—that is, during the addition of the nitroparaffin-aqueous alkali mixture or the aqueous mixture of nitroparaffin salt to a mineral acid other than nitrous acid—to maintain the temperature below about 15° C. In general, temperatures from about 0° C. to about 5° C. are preferred for the acidification operation. It has been found that if the temperature of the reaction mixture so formed is allowed to increase above about 20° C. during acidification, increasing amounts of nitrous oxide ($N_2O$) are produced and less nitrolic acid or pseudonitrole is found in the reaction product. In separating the nitrolic acid or pseudonitrole formed in the reaction from the reaction mixture, care must be taken that the temperature is maintained below the decomposition temperature of the said nitrolic acid or pseudonitrole, lest the yield thereof be lowered appreciably. It will be apparent that the decomposition temperature will vary for the individual nitrolic acids and pseudonitroles obtained in the present method; however, it is preferred that the separation procedure be carried out at temperatures below about 15° C.

In the acidification operation, any mineral acid other than nitrous acid may be used; typical acids are hydrochloric, nitric and sulphuric. The concentration of such mineral acids may be varied considerably. It is preferred that the mineral acid have such a concentration that no appreciable heat is evolved when the acid is diluted with or added to water. The quantity of acid used may be varied over a relatively wide range, but it is desirable to use a slight excess of acid in the acidification step. As previously pointed out in the aforesaid copending application, identified hereinabove, it is advantageous to keep added oxygen from the reaction mixture.

Since filing the above-identified application, analysis of these investigations indicates that a reaction mechanism other than the one there proposed most probably obtains. These investigations point to the following mechanism which is illustrated by the preparation of propyl nitrolic acid from 1-nitropropane, being represented by Equation III below.

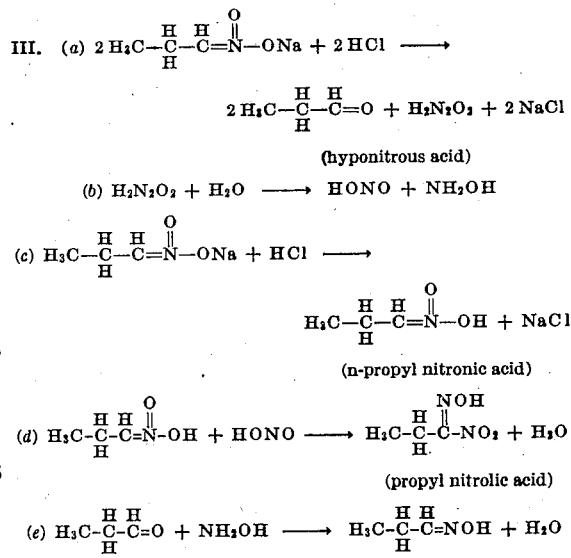

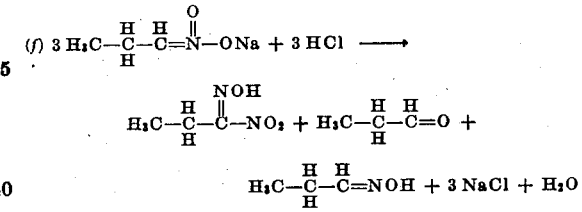

The overall reaction from Equation III, (a) through (e), may be represented by Equation III, (f):

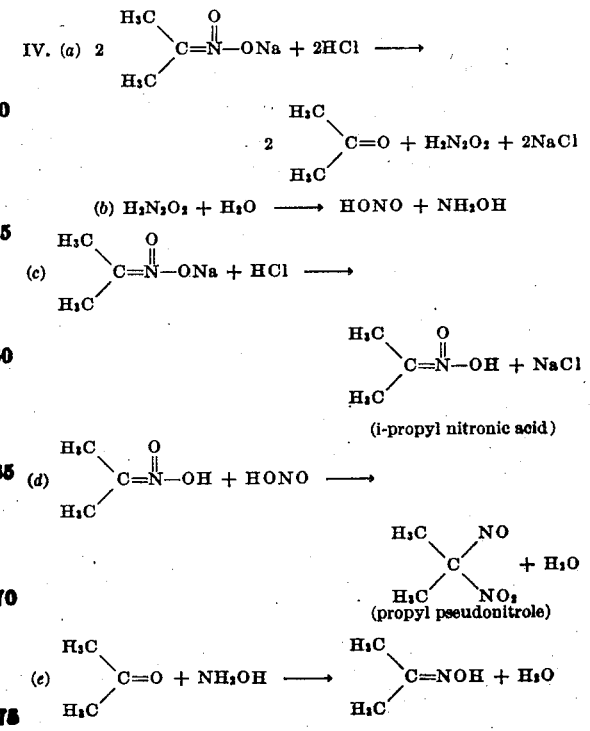

Following the same reaction mechanism, a secondary nitroparaffin such as 2-nitropropane is converted to propyl pseudonitrole as indicated in Equation IV below:

The overall reaction from Equation IV, (a) through (e), may be represented by Equation IV, (f):

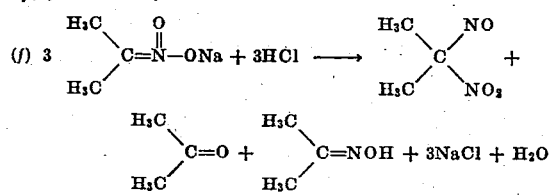

It is to be understood, however, that the foregoing proposed reaction mechanism is that which appears to obtain on the basis of present investigations; yet, it is not to be construed in any way as a limitation upon the method described herein and defined in the claims appended hereto.

To illustrate the effect of rate of addition of nitroparaffin-aqueous alkali mixture or aqueous mixture of nitroparaffin salt to a mineral acid other than nitrous acid, the curve in Figure I is provided. In obtaining the said curve, all reaction conditions were maintained substantially constant while the time of addition was varied. Mixtures of 2-nitropropane and NaOH (10 per cent aqueous solution) comprising 0.2 mole of 2-nitropropane and 0.22 mole of NaOH were added to 21.4 cc. of concentrated hydrochloric acid (equivalent to 0.25 mole HCl), diluted with an equal volume of water and with about 5 volumes of ice, the mixtures being constantly agitated. The reaction mixtures so obtained were agitated for about 45 minutes after complete addition to the acid. The temperatures during addition and during the following period were maintained below 5° C., the temperature range being from about −13° C. to 5° C. The reaction mixtures so obtained were then allowed to stand for about 16 hours in a cold room maintained at −1° C. All reaction products were blue solutions from which a cream colored solid precipitated. The solid was filtered onto a Büchner funnel, washed with water, dried on filter paper and weighed. In each case the solid was the dimeric form of propyl pseudonitrole. The pure dimer is colorless, melts to a blue liquid and then decomposes. When dissolved in organic liquids, such as benzene, carbon tetrachloride or acetic acid, a deep blue color is imparted to the organic liquids. This color change is believed to be the result of the dimer changing to the monomer. The melting point of the solid product is 75° C., and this is the value reported in the literature for propyl pseudonitrole. The curve demonstrates the profound effect of the rate of addition, for example, when the addition was completed in 5 minutes, the yield was only 2.0 per cent; contrasted with this are such typical addition periods as about 70 minutes and about 150 minutes where the yields were 16 per cent and 88 per cent, respectively.

It should be clear from the foregoing that the present method is a valuable means for preparing nitrolic acids and pseudonitroles. As is well known in the art, such compounds are valuable intermediates in chemical synthesis; and, recently, these compounds have been found to be extremely effective ignition improvers in Diesel-type fuels. It will also be apparent that the present method provides a means for obtaining appreciable yields of valuable chemicals, such as aldehydes, ketones and oximes.

The method contemplated herein is useful not only for the preparation of unsubstituted nitrolic acids and unsubstituted pseudonitroles, but is useful as well for the preparation of various substituted analogs. For example, halogen-substituted nitrolic acids and pseudonitroles may be prepared from their corresponding halogen-substituted primary and secondary nitroparaffins, respectively. In general, any substituent group such as halogen, keto, amino, hydroxyl, etc., may be present on the nitroparaffin reactant, and thus present on the resulting nitrolic acid or pseudonitrole, so long as the substituent group does not interfere with the formation of the alkali or alkaline earth metal salt of the nitroparaffin.

Although the present invention has been illustrated hereinabove by the preparation of specific nitrolic acids and pseudonitroles, it is to be understood that these specific embodiments are but representative of my improved method for the preparation of compounds of the broad classes of nitrolic acids and pseudonitroles. Accordingly, the present invention is not to be construed as limited thereto but is to be broadly construed in the light of the defining language of the appended claims.

I claim:

1. The method of preparation of a compound selected from the group consisting of a nitrolic acid and a pseudonitrole, which comprises: contacting a mononitroparaffin selected from the group consisting of a primary and a secondary mononitroparaffin with a relatively strong aqueous alkali; adding the mononitroparaffin-aqueous alkali reaction product so obtained to a mineral acid other than nitrous acid at a temperature below about 15° C. at a slow rate; and separating said compound from the reaction mixture obtained in the preceding operation at a temperature below the decomposition temperature of said compound.

2. The method of preparation of a compound selected from the group consisting of a nitrolic acid and a pseudonitrole, which comprises: contacting a mononitroparaffin selected from the group consisting of a primary and a secondary mononitroparaffin with substantially a stoichiometrical amount of an aqueous alkali selected from the group consisting of an aqueous alkali metal hydroxide and an aqueous alkaline earth metal hydroxide; adding the mononitroparaffin-aqueous alkali reaction product so obtained to a mineral acid other than nitrous acid at a temperature below about 15° C. at a slow rate; and separating said compound from the reaction mixture obtained in the preceding operation at a temperature below the decomposition temperature of said compound.

3. The method of preparation of a compound selected from the group consisting of a nitrolic acid and a pseudonitrole, which comprises: contacting a mononitroparaffin selected from the group consisting of a primary and a secondary mononitroparaffin with substantially a stoichiometrical amount of an aqueous alkali metal hydroxide; adding the mononitroparaffin-aqueous alkali reaction product so obtained to a mineral acid other than nitrous acid at a temperature below about 15° C. at a slow rate; and separating said compound from the reaction mixture obtained in the preceding operation at a temperature below the decomposition temperature of said compound.

4. The method of preparation of a compound selected from the group consisting of a nitrolic acid and a pseudonitrole, which comprises: contacting a mononitroparaffin selected from the group consisting of a primary and a secondary mononitroparaffin with a relatively strong aqueous alkali; aging the mononitroparaffin-aqueous alkali reaction product so obtained; adding the said aged mononitroparaffin-aqueous alkali reaction product to a mineral acid other than nitrous acid at a temperature below about 15° C. at a slow rate; and separating said compound from the reaction mixture obtained in the preceding operation at a temperature below the decomposition temperature of said compound.

5. The method of preparation of a compound selected from the group consisting of a nitrolic acid and a pseudonitrole, which comprises: adding to a mineral acid other than nitrous acid at a slow rate at a temperature below about 15° C., an aqueous mixture of a salt of a mononitroparaffin selected from the group consisting of a primary and a secondary mononitroparaffin, said salt being selected from the group consisting of an alkali metal salt and an alkaline earth metal salt; and separating said compound from the reaction mixture obtained in the preceding operation at a temperature below the decomposition temperature of said compound.

6. The method of preparation of a compound selected from the group consisting of a nitrolic acid and a pseudonitrole, which comprises: adding to a mineral acid other than nitrous acid at a slow rate at a temperature below about 15° C., an aqueous mixture of an alkali metal salt of a mononitroparaffin selected from the group consisting of a primary and a secondary mononitroparaffin; and separating said compound from the reaction mixture obtained in the preceding operation at a temperature below the decomposition temperature of said compound.

7. The method of preparation of a compound selected from the group consisting of a nitrolic acid and a pseudonitrole, which comprises: adding to a mineral acid other than nitrous acid at a slow rate at a temperature below about 15° C., an aqueous mixture of an aged salt of a mononitroparaffin selected from the group consisting of a primary and a secondary mononitroparaffin, said salt being selected from the group consisting of an alkali metal salt and an alkaline earth metal salt; and separating said compound from the reaction mixture obtained in the preceding operation at a temperature below the decomposition temperature of said compound.

8. The method of preparation of a compound selected from the group consisting of a nitrolic acid and a pseudonitrole, which comprises: adding to a mineral acid other than nitrous acid at a slow rate at a temperature below about 15° C., an aqueous mixture of an aged alkali metal salt of a mononitroparaffin selected from the group consisting of a primary and a secondary mononitroparaffin; and separating said compound from the reaction mixture obtained in the preceding operation at a temperature below the decomposition temperature of said compound.

9. The method of preparation of propyl pseudonitrole, which comprises: contacting 2-nitropropane with substantially a stoichiometrical amount of aqueous sodium hydroxide; adding the 2-nitropropane-sodium hydroxide reaction product so obtained to a mineral acid other than nitrous acid at a temperature below about 15° C. at a slow rate; and separating said propyl pseudonitrole from the reaction mixture obtained in the preceding operation at a temperature below about 15° C.

10. The method of preparation of propyl pseudonitrole, which comprises: contacting 2-nitropropane with substantially a stoichiometrical amount of aqueous sodium hydroxide; adding the 2-nitropropane-sodium hydroxide reaction product so obtained to a mineral acid other than nitrous acid at a temperature below about 15° C. at a rate slower than the rate determined by the addition of 0.2 mole of said 2-nitropropane-sodium hydroxide reaction product to substantially 0.22 mole in about two hours; and separating said propyl pseudonitrole from the reaction mixture obtained in the preceding operation at a temperature below about 15° C.

11. The method of preparation of propyl pseudonitrole, which comprises: contacting 2-nitropropane with substantially a stoichiometrical amount of aqueous sodium hydroxide; aging the 2-nitropropane-sodium hydroxide reaction product so obtained; adding the said aged 2-nitropropane-sodium hydroxide reaction product to a mineral acid other than nitrous acid at a temperature below about 15° C. at a slow rate; and separating said propyl pseudonitrole from the reaction mixture obtained in the preceding operation at a temperature below about 15° C.

12. The method of preparation of propyl pseudonitrole, which comprises: adding to a mineral acid other than nitrous acid at a slow rate at a temperature below about 15° C., an aqueous mixture of a salt of 2-nitropropane, said salt being selected from the group consisting of an alkali metal salt and an alkaline earth metal salt; and separating said propyl pseudonitrole from the reaction mixture obtained in the preceding operation at a temperature below the decomposition temperature of said propyl pseudonitrole.

13. The method of preparation of propyl pseudonitrole, which comprises: adding to a mineral acid other than nitrous acid at a slow rate at a temperature below about 15° C., an aqueous mixture of an aged salt of 2-nitropropane, said salt being selected from the group consisting of an alkali metal salt and an alkaline earth metal salt; and separating said propyl pseudonitrole from the reaction mixture obtained in the preceding operation at a temperature below the decomposition temperature of said propyl pseudonitrole.

14. The method of preparation of propyl nitrolic acid, which comprises: contacting 1-nitropropane with substantially a stoichiometrical amount of aqueous sodium hydroxide; adding the 1-nitropropane-sodium hydroxide reaction product so obtained to a mineral acid other than nitrous acid at a temperature below about 15° C. at a slow rate; and separating said propyl nitrolic acid from the reaction mixture obtained in the preceding operation at a temperature below about 15° C.

EDWIN M. NYGAARD.